United States Patent [19]

Soffer

[11] 4,132,837
[45] Jan. 2, 1979

[54] ELECTROCHEMICAL CELLS WITH NON-AQUEOUS ELECTROLYTES CONTAINING MACROHETEROCYCLIC COMPOUNDS

[75] Inventor: Abraham Soffer, Arad, Israel

[73] Assignee: University Patents, Inc., Stamford, Conn.

[21] Appl. No.: 891,807

[22] Filed: Mar. 30, 1978

[51] Int. Cl.² .............................................. H01M 6/14
[52] U.S. Cl. .................................. 429/194; 429/198; 429/199; 252/62.2
[58] Field of Search ............... 429/194, 197, 198, 199; 252/62.2, 500, 518

[56] References Cited

U.S. PATENT DOCUMENTS 3,997,362  12/1976  Eustace ................................ 429/194

Primary Examiner—Charles F. LeFevour
Attorney, Agent, or Firm—Scully, Scott, Murphy & Presser

[57] ABSTRACT

High energy output primary and secondary electrochemical cells are disclosed as having a light metal anode such as lithium metal, a cathode and a non-aqueous electrolyte comprising an aprotic solvent having dissolved therein an electrically conductive salt and a macroheterocyclic compound complexed with the cation moiety of the salt.

35 Claims, 1 Drawing Figure

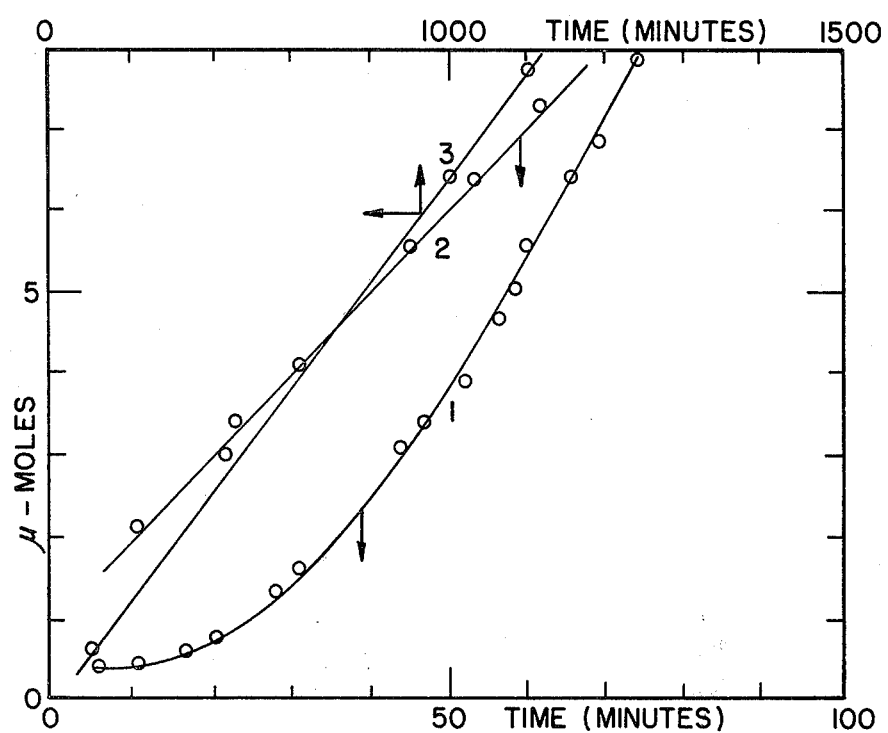

ELECTROCHEMICAL CELLS WITH NON-AQUEOUS ELECTROLYTES CONTAINING MACROHETEROCYCLIC COMPOUNDS

BACKGROUND OF THE INVENTION

1. Field of the Invention

This invention relates to the field of electrochemical batteries of both the primary and secondary (storage or rechargeable) type and, more particularly, relates to the field of electrochemical batteries having non-aqueous electrolyte systems.

2. Description of the Prior Art

In recent years, numerous proposals have been made for increasing the gravimetric and volumetric energy densities of electrochemical batteries through the application of highly reactive metals, e.g., the alkali metals and the alkaline earth metals, as anodic materials. Lithium metal has received by far the most attention in this regard due to its very low atomic weight and its being the most electronegative of all the metals. Batteries containing lithium or other light metal anodes cannot employ aqueous and other active hydrogen-containing electrolytes since contact of these metals with such electrolytes would result in oxidation of the latter and evolution of hydrogen gas. Accordingly, batteries of this type which are intended for service at ambient temperatures are provided with non-aqueous electrolytes in which electrically conductive salts are dissolved in organic aprotic solvents. Among the numerous electrically conductive salts which have heretofore been employed in non-aqueous electrolyte systems are the light metal and ammonium salts of such anions as the halides, halates, perhalates, haloaluminates, haloarsenates, halophosphates, haloacetates, phosphates, thiocyanates, sulfides, sulfates, cyanides, picrates, acetylacetonates, fluoborates, hydrides, borohydrides, and so forth. These and other electrically conductive salts have been dissolved in a wide variety of organic aprotic solvents including the normal and branched paraffins and cycloparaffins; aromatic hydrocarbons such as benzene, toluene and xylene; Lewis bases such as the tertiary amines; amides and substituted amides such as formamide; nitriles such as acetonitrile, propionitrile and benzonitrile; open chain and cyclic esters such as propylene carbonate, alkyl acylates and butyrolactone; oxysulfur compounds such as dimethylsulfoxide, dimethylsulfite and tetramethylene sulfone; and, open chain and cyclic ethers such as the poly (alkyleneoxy) glycols, dioxane and the substituted dioxanes, dioxolane, tetrahydrofuran and tetrahydropyran. Illustrative of primary and/or secondary batteries having light metal anodes and non-aqueous electrolytes are those described in U.S. Pat. Nos. 3,185,590; 3,393,092; 3,404,042; 3,413,154; 3,489,611; 3,531,328; 3,533,853; 3,542,601; 3,542,602; 3,578,500; 3,764,385; 3,918,988; 3,920,477; 3,928,067; 3,928,070; 3,953,302; and 3,982,958.

Ideally, the organic aprotic solvent selected for use in non-aqueous electrolytes should combine good solvency for the electrically conductive solute (to permit high levels of ionic conductivity) with long term stability in contact with the anode. In practice, the properties are inherently opposed to each other. The electrolyte solvents of high solvency, i.e., the polar solvents, are the least stable in contact with the highly electronegative light metals. The solvents of high stability, i.e., non-polar solvents such as the aromatic hydrocarbons, have the poorest solvency for the electrically conductive salts. One possible mechanism which would explain the poor stability of a polar aprotic solvent toward light metals is that the cation of the electrically conductive salt dissolved in the solvent behaves as a Lewis acid catalyst through association with the electronegative element of the solvent. Such association is thought to result in a shift of negative charge to the cation rendering the electronegative element and the carbn atom adjacent to it more positive. This in turn facilitates the electron transfer to the solvent molecule and the production of an anion radical as the initial step in the solvent decomposition process. Regardless of the precise nature by which the polar aprotic solvents are eventually degraded, the fact remains that the usefulness of these solvents in high energy battery systems is limited by their tendency to undergo decomposition in the presence of light metal anodes.

SUMMARY OF THE INVENTION

It has been very surprisingly discovered that if a macroheterocyclic compound as hereinafter defined is incorporated into a non-aqueous electrolyte system based upon an organic polar aprotic solvent, the tendency of the solvent to degrade in the presence of light metal anodes will be substantially if not completely attenuated.

Primary and secondary batteries of the light metal anode type employing non-aqueous electrolytes in accordance with this invention offer improved performance and reliability since electrolyte systems possessing a high degree of solvation for electrically conductive salts may be freely selected without concern for solvent decomposition. Moreover, light metal anode secondary batteries provided with the electrolyte systems herein are capable of undergoing an increased number of charge-discharge cycles due to the significantly enhanced stability of the solvent component of the electrolyte.

Although the exact mechanism whereby the macroheterocyclic compounds reduce or eliminate solvent degradation is not known with certainty, it would appear to involve the ability of these compounds to form complexes with the light metal cations present in the electrolyte.

This invention also contemplates light metal anode electrochemical cells in which the electrolyte system contains a non-polar solvent which is a solvent for the cation-complexed macroheterocyclic compound. While non-polar solvents such as the aliphatic and aromatic hydrocarbons demonstrate little if any solvation for electrically conductive salts, the macroheterocyclic compounds herein are readily soluble in such media and permit the introduction of the salts into these solvents in complexed form. Such use of macroheterocyclic compounds exploits the advantage of high stability possessed by non-polar solvents exposed to light metals while overcoming the disadvantage of poor solvency of these solvents.

In addition to their application in primary and secondary batteries of all types, including flat cells for films, the non-aqueous electrolytes of this invention containing macroheterocyclic compounds can also be advantageously utilized in electroplating and electrowinning cells.

BRIEF DESCRIPTION OF THE DRAWING

In the single FIGURE of drawing is a graphic presentation of the rate of decomposition reaction of lithium with propylene carbonate. The graph is a plot of the amount of propylene produced as a function of time.

DESCRIPTION OF THE PREFERRED EMBODIMENTS

The term "macroheterocyclic compound" as used herein defines organic heterocyclic compounds having each of the following characteristics:

(a) a cavity within the cyclic structure having dimensions sufficient to incorporate the cation(s) of the electrically conductive salt(s) which are dissovled in the polar aprotic solvent;

(b) the atoms which are at the center of the cavity are the heteroatom members of the cyclus;

(c) the heteroatoms are more electronegative than the carbon atom members of the cyclus in accordance with the Pauling scale of electronegativity;

(d) there are at least four heteroatoms at the center of the cavity;

(e) there are two or three carbon atoms separating each heteroatom located at the center of the cavity; and (f) the heteroatoms include at least one atom selected from the group consisting of oxygen and tertiary nitrogen atoms.

Examples of compounds meeting each and every one of the above-cited requirements for a useful macroheterocyclic compound in accordance with this invention are certain of the so-called "crown ethers" and structurally related cryptands. A crown ether is a macrocyclic polyether containing repetitive units of the structure

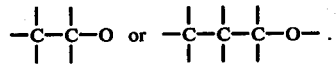

The resulting compound is a rigid heterocycle with a bidimensional cavity disposed within the center of the macromolecule with the ethereal oxygens facing inwardly of the cavity in coplanar fashion. Depending upon the number of recurring units bearing a hetero oxygen atom, the cavity of a crown ether can be tailored to accommodate a nonsolvated cation with the formation of a stable complex. Cryptands are similar in structure to crown ethers with the exception that two hetero oxygens are replaced in the latter with tertiary nitrogen atoms so as to enable the formation of a third crossing chain.

Among the macroheterocyclic compounds which can be successfully employed in the non-aqueous electrolytes of this invention are crown ethers described in U.S. Pat. Nos. 3,562,295; 3,687,978 and 3,987,061 to Pedersen; crown, lantern and clam macrocyclic hetero imine compounds of U.S. Pat. No. 3,847,949 to Pedersen et al.; macromonocyclic compounds of U.S. Pat. No. 3,966,766 to Lehn; multiheteromacrocycles of U.S. Pat. Nos. 3,965,116 and 4,001,279 to Cram; and, the aroylcrownethers of U.S. Pat. Nos. 3,997,565 and 4,024,158 to Kauer et al. Each of the aforesaid patents is incorporated by reference herein.

Examples of macroheterocyclic compounds which have demonstrated good complexing capability for the cations of electrically conductive salts are the following:

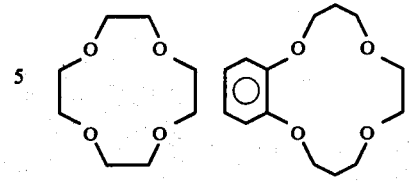

12 crown 4 ether    benzo 14 crown 4 ether

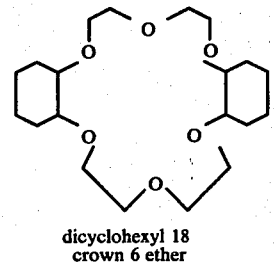

dicyclohexyl 18 crown 6 ether 12 crown 4 ether and benzo 14 crown 4 ether form stable complexes with lithium cation and dicyclohexyl 18 crown 6 forms stable complexes with potassium and rubidium cations. Examples of cryptands which are useful herein are the compounds:

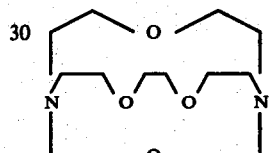

Cryptand 211

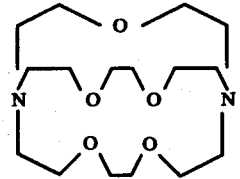

Cryptand 221

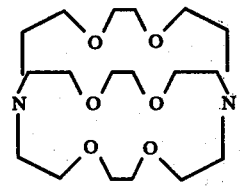

Cryptand 222

Cryptands 211, 221 and 222 complex respectively with $Li^+$ (and $Mg^+$), $Na^+$ and $K^+$ cations. Other complexes of macroheterocyclic compounds and metal cations and various methods for their preparation are disclosed in U.S. Pat. No. 3,686,225 to Pederson which is incorporated by reference herein.

Among the electrically conductive salts which can be complexed with the macroheterocylic compounds of this invention are those wherein the cations are alkali metal ions, ions of alkali earth metals of atomic weight greater than 40 ammonium ions, cations containing —$NH_3^+$, $Cu^+$, $Ag^+$, $Au^+$, $Hg^+$, $Hg^{++}$, $Tl^+$, $Pb^{++}$, and $Ce^{+++}$.

The electrically conductive salt cation-macroheterocyclic compound complexes can be incorporated into organic solvent media up to the limit of their solubility in the latter. Any of the aprotic polar and non-polar organic solvents heretofore employed in non-aqueous electrolyte systems, a number of which have been previously recited, can be used herein with mixtures of non-polar and polar solvents as in U.S. Pat. No. 4,069,374 to Gabano also being useful. Similarly, one or more of any of the known and conventional electrically conductive salts representative examples of which are given above, can also be advantageously employed in the non-aqueous electrolytes of this invention. The inorganic lithium salts are especially preferred herein and include lithium salts whose anions are azide, halide, halate, perhalate, cyanide, sulfide, sulfate, hydrosulfite, iodite, nitrate, hypochlorite, nitrite, thiocyanate etc.

Formation of metal complexes of the macroheterocyclic compounds can be carried out in the polar aprotic solvents by combining the electrically conductive salt, solvent and macroheterocyclic compound in any desired order. When non-polar aprotic solvents such as the aliphatic and aromatic hydrocarbons are employed in the electrolyte media, the soluble electrically conductive salt cation-macroheterocyclic compound complex can be incorporated therein by first dissolving the salt and the macroheterocyclic compound in a mutual polar aprotic solvent, removing the solvent from the resulting complex, generally under vacuum, and adding the solvent-free complex to the non-polar aprotic solvent. Other methods by which the complexes can be readily incorporated into solvent media are described in U.S. Pat. No. 3,686,225 to Pedersen referred to earlier.

The electrically conductive salt should be used in concentrations in excess of about 0.1 molar with respect to the solvent medium selected with a range of about 10.2 to about 0.6 or saturation, whichever is higher, being preferred. The ratio of macroheterocyclic compound to the electrically conductive salt should be greater than about 1:1 with a ratio greater than about 2:1 being preferred. In general, the concentration of electrically conductive salt and its composition should be such that the electrolyte has a specific conductivity of from about $10^{-4}$ (ohm cm.)$^{-1}$ to about $10^{-1}$ (ohm cm.)$^{-1}$.

The anodic material of the electrochemical cells herein is a light metal having a chemical equivalent weight (atomic weight divided by the valence of the active ion) less than about 70. The light alkali metals such as lithium, sodium and potassium are preferred and of these, lithium is especially preferred because of its strong electro-positiveness and light weight. Additional light metals which can be utilized as the anode with good results and rubidium magnesium, beryllium, boron, aluminum, calcium, titanium, vanadium, chromium, manganese, iron, cobalt, nickel, copper and zinc.

Numerous cathodic materials can be selected in accordance with considerations well known in the art. Cathode materials are characterized by the ease with which they accept electrons. Such materials include elements from group V-A, V1-A and VII-A of series 1 and 2 of the Periodic Table, especially oxygen, sulfur, fluorine and chlorine, sulfates of heavy metals like mercurous sulfate, mercuric sulfate, lead sulfate, etc. Since these cathodes are normally non-conductive, they are combined with a cathecter, usually in finely divided form, which is inert to the electrolyte and which serves to conduct current to the cathode terminal, e.g. carbon, silver, nickel or platinum. Other materials such as paper fibers, cellulose acetate and polystyrene can be incorporated into the cathode structure to act as binders. Electron exchange organic polymers such as those described in U.S. Pat. No. 3,185,590 to Mayer et al. also provide useful cathodes.

The choice of the bare electrode conductors for attachment to the anode and cathode is very wide since corrosion is usually not a problem. Among the satisfactory electrode conductors are tungsten, aluminum, stainless steel, steel, graphite, lead oxide, platinum, copper, nickel, silver, iron and brass.

EXAMPLE

The remarkable stability conferred upon non-aqueous electrolytes prepared in accordance with this invention is demonstrated herein.

The decomposition rates of the polar aprotic solvent, propylene carbonate, in the presence of lithium amalgam were evaluated with and without electrically conductive solute (lithium perchlorate) being present, In the former case, the stabilizing effect of 12-crown-4 ether was fully established. Propylene carbonate was selected as the solvent because of the simple and readily detectable decomposition products provided in yields of above 90% according to the equation:

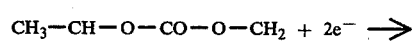

The purification of the separate compounds, the preparation of the propylene carbonate - lithium perchlorate electrolyte and the decomposition procedures were carried out in a glass high vacuum system. The stopcocks of the vacuum line were polytetrafluoroethylene and glass. Propylcarbonate was dried over molecular sieves for several days followed by fractional distillation in vacuo. The middle section of the distillate was separately sampled, passed over a molecular sieve column pre-evacuated at 280° C. overnight, and stored under positive purified argon pressure. Anhydrous lithium perchlorate was evacuated at 200° C. for a few hours until high vacuum ($5 \times 10^{-6}$ torr) was obtained. The 12-crown-4 ether was subject to repeated bulb to bulb vacuum distillation at 100° C., while one of the bulbs contained 4 angstrom molecular sieves (prevacuum treated at 200° C.). The preparation of the propylene carbonate-lithium perchlorate solution was carried out within the vacuum line by manipulation with argon gas (99.99% further purified over magnesium shaving at 520° C.). The solution and crown ether were transferred to a reaction cell using glass syringes oven dried at 120° C. The lithium amalgam 0.0035 w/o was contained in a separate bulb connected through a valve to the reaction chamber. The decomposition reaction was followed by monitoring the propylene gas pressure in a known volume portion of the vacuum system. The pressure was measured using a mercury manometer having a resolution of 0.3 torr. The completion of reaction typically produced 80 torr of propylene.

The results set forth in the accompanying FIGURE of drawing clearly show that the initial rate of decomposition for the pure solvent (curve 1) is practically zero increasing in time to a constant value comparable to that of 1.1M lithium perchlorate solution (curve 2). Curve 1 tends to support a solvent degradation mechanism wherein the lithium cation produced by slowly reducing the solvent acts as a catalyst.

The 12-crown-4 ether macroheterocyclic compound at a concentration almost three times greater than that of the lithium cation reduces the rate of reaction by a factor of almost nineteen (curve 3, upper time scale) as compared to curve 1.

The foregoing result, which is typical of those which are obtained with the use of macroheterocyclic compounds in non-aqueous electrolyte systems in accordance with this invention, is dramatic evidence of the stabilizing effect of such compounds on solvent media which are otherwise prone to degradation in the presence of light metal anodes.

What is claimed is:

1. An electrochemical cell comprising a light metal anode, a cathode and a non-aqueous electroyte comprising an aprotic organic solvent having dissolved therein an electrically conductive salt and a macroheterocyclic compound complexed with the cation moiety of the salt.

2. The electrochemical cell of claim 1 wherein the macroheterocyclic compound is selected from the group consisting of crown ethers; cryptands; crown, lantern and clam macrocyclic hetero imine compounds; and, aroylcrownethers.

3. The electrochemical cell of claim 2 wherein the crown ether is selected from the group consisting of 12 crown 4 ether, benzo 14 crown 4 ether and dicyclohexyl 18 crown 6 ether.

4. The electrochemical cell of claim 2 wherein the cryptand is selected from the group consisting of cryptand 211, cryptand 221 and cryptand 222.

5. The electrochemical cell of claim 1 wherein the aprotic solvent is a polar aprotic organic solvent.

6. The electrochemical cell of claim 5 wherein the polar aprotic organic solvent is selected from the group consisting of tertiary amines; amides and substituted amides; open chain and cyclic esters; oxysulfur compounds; and, open chain and cyclic ethers.

7. The electrochemical cell of claim 1 wherein the aprotic solvent is a non-polar aprotic organic solvent.

8. The electrochemical cell of claim 7 wherein the non-polar aprotic organic solvent is selected from the group consisting of normal and branched paraffins; cycloparaffins; and, aromatic hydrocarbons.

9. The electrochemical cell of claim 1 wherein the light metal anode is an alkali metal anode.

10. The electrochemical cell of claim 9 wherein the alkali metal anode is a lithium anode.

11. The electrochemical cell of claim 1 wherein the electrically conductive salt contains a light metal cation and an anion selected from the group consisting of the halides, halates, perhalates, haloaluminates, haloarsenates, halophosphates, haloacetates, phosphates, thiocyanates, sulfides, sulfates, cyanides, picrates, acetylacetonates, fluoborates, hydrides and borohydrides.

12. The electrochemical cell of claim 1 wherein the electrically conductive salt contains lithium cation and an anion selected from the group consisting of azide, halide, halate, perhalate, cyanide, sulfide, sulfate, hydrosulfite, iodate, nitrate, hypochlorite, nitrate and thiocyanate.

13. The electrochemical cell of claim 1 wherein the electrically conductive salt is present in a concentration in excess of about 0.1 molar with respect to the solvent.

14. The electrochemical cell of claim 13 wherein the electrically conductive salt is present in a concentration of from about 0.6 to saturation with respect to the solvent.

15. The electrochemical cell of claim 1 wherein the ratio of macroheterocyclic compound to the electrically conductive salt is greater than about 1:1.

16. The electrochemical cell of claim 15 wherein the ratio of macroheterocyclic compound to the electrically conductive salt is greater than about 2:1.

17. The electrochemical cell of claim 1 wherein the electroltye has a specific conductivity of from about $10^{-4}$ (ohm cm.)$^{-1}$ to about $10^{-1}$ (ohm cm)$^{-1}$.

18. The electrochemical cell of claim 1 wherein the cell is incorporated in a primary or secondary battery.

19. A non-aqueous electroltye for use in a light metal anode electrochemical cell comprising an aprotic organic solvent having dissolved therein an electrically conductive salt and a macroheterocyclic compound complexed with the cation moiety of the salt.

20. The non-aqueous electrolyte of claim 9 wherein the macroheterocyclic compound is selected from the group consisting of crown ethers; cryptands; crown, lantern and clam macrocyclic hetero imine compounds; and, aroylcrown-ethers.

21. The non-aqueous electrolyte of claim 20 wherein the crown ether is selected from the group consisting of 12 crown 4 ether, benzo 14 crown 4 ether and dicyclohexyl 18 crown 6 ether.

22. The non-aqueous electrolyte of claim 20 wherein the cryptand is selected from the group consisting of cryptand 211, cryptand 221 and cryptand 222.

23. The non-aqueous electrolyte of claim 19 wherein the aprotic solvent is a polar aprotic organic solvent.

24. The non-aqueous electrolyte of claim 23 wherein the polar aprotic organic solvent is selected from the group consisting of tertiary amines; amides and substituted amides; open chain and cyclic esters; oxysulfur compounds; and, open chain and cyclic ethers.

25. The non-aqueous electrolyte of claim 19 wherein the aprotic solvent is a non-polar aprotic organic solvent.

26. The non-aqueous electrolyte of claim 25 wherein the non-polar aprotic organic solvent is selected from the group consisting of normal and branched paraffins; cycloparaffins; and, aromatic hydrocarbons.

27. The non-aqueous electrolyte of claim 19 wherein the electrically conductive salt contains a light metal cation and an anion selected from the group consisting of the halides, halates, perhalates, haloaluminates, haloarsenates, halophosphates, haloacetates, phosphates, thiocyanates, sulfides, sulfates, cyanides, picrates, acetylacetonates, fluoborates, hydrides and borohydrides.

28. The non-aqueous electrolyte of claim 19 wherein the electrically conductive salt contains lithium cation and an anion selected from the group consisting of azide, halide, halate, perhalates, cyanide, sulfide, sulfate hydrosulfite, iodate, nitrate, hypochlorite, nitrate and thiocyanate.

29. The non-aqueous electrolyte of claim 19 wherein the electrically conductive salt is present in a concentration in excess of about 0.1 molar with respect to the solvent.

30. The non-aqueous electroltye of claim 29 wherein the electrically conductive salt is present in a concentration of from about 0.6 to saturation with respect to the solvent.

31. The non-aqueous electrolyte of claim 19 wherein the ratio of macroheterocyclic compound to the electrically conductive salt is greater than about 1:1.

32. The non-aqueous electrolyte of claim 31 wherein the ratio of macroheterocyclic compound to the electrically conductive salt is greater than about 2:1.

33. The non-aqueous electrolyte of claim 19 wherein the electrolyte has a specific conductivity of from about $10^{-4}$ (ohm cm.)$^{-1}$ to about $10^{-1}$ (ohm cm.)$^{-1}$.

34. The non-aqueous electrolyte of claim 19 wherein the electrolyte is incorporated in a primary or secondary battery.

35. A method for improving the stability of polar aprotic organic solvents employed in non-aqueous electrolyes of light metal anode electrochemical cells which comprises dissolving in an aprotic organic solvent at least one macroheterocyclic compound complexed with the cation moiety of an electrically conductive salt.

* * * * *

UNITED STATES PATENT AND TRADEMARK OFFICE
CERTIFICATE OF CORRECTION

PATENT NO. : 4,132,837
DATED : January 2, 1979
INVENTOR(S) : Abraham Soffer

It is certified that error appears in the above-identified patent and that said Letters Patent are hereby corrected as shown below:

Column 1, line 62, "the", second occurrence, should read as --these--.

Column 2, line 8, "carbn atom" should read as --carbon atoms--.

Column 2, line 68, "of decomposition" should read as --of the decomposition--.

Column 6, line 56, "shaving" should read as --shavings--.

Claim 20, line 1, "9" should read as --19--.

Signed and Sealed this

Twenty-fourth Day of April 1979

[SEAL]

Attest:

RUTH C. MASON
Attesting Officer

DONALD W. BANNER
Commissioner of Patents and Trademarks